United States Patent
Le Roi

(10) Patent No.: US 8,714,962 B2
(45) Date of Patent: May 6, 2014

(54) THERMOFORMING MOULD WITH THERMAL INSULATION AND ASSOCIATED METHOD

(75) Inventor: Paul Le Roi, Ris-Orangis (FR)

(73) Assignee: A.R.C.I.L., Puisex Pontoise (FR)

( * ) Notice: Subject to any disclaimer, the term of this patent is extended or adjusted under 35 U.S.C. 154(b) by 605 days.

(21) Appl. No.: 12/727,540

(22) Filed: Mar. 19, 2010

(65) Prior Publication Data

US 2010/0237543 A1   Sep. 23, 2010

(30) Foreign Application Priority Data

Mar. 20, 2009   (FR) ...................... 09 01306

(51) Int. Cl.
- *B29C 51/12* (2006.01)
- *B29C 51/18* (2006.01)
- *B29C 51/42* (2006.01)

(52) U.S. Cl.
USPC ........... 425/501; 425/507; 425/508; 425/509; 425/112; 425/121

(58) Field of Classification Search
CPC .. B29C 33/3828; B29C 51/16; B29C 51/162; B29C 51/165; B29C 51/167; B29C 51/18; B29C 51/20; B29C 51/22; B29C 51/225; B29C 51/24; B29C 1/30; B29C 51/36; B29C 51/303; B29C 51/306; B29C 51/421; B29C 51/422; B29C 51/426
USPC ........... 425/112, 121, 122, 126.1, 126.2, 503, 425/507, 508, 509, 538, DIG. 219, 123, 425/124, 179, 255, 284, 285, 393, 403, 426, 425/427, 428, 441, 443, 501, 502, 504, 517
See application file for complete search history.

(56) References Cited

U.S. PATENT DOCUMENTS

| | | | | |
|---|---|---|---|---|
| 1,595,127 | A * | 8/1926 | Spaid | 425/436 R |
| 2,282,423 | A | 5/1942 | Kopitke | |
| 3,244,779 | A * | 4/1966 | Levey et al. | 264/522 |
| 3,338,997 | A * | 8/1967 | Tigner | 264/549 |
| 3,422,522 | A * | 1/1969 | Mojonnier | 29/412 |
| 3,528,865 | A * | 9/1970 | Amberg et al. | 156/214 |
| 3,612,346 | A * | 10/1971 | Schneider | 206/519 |
| 3,684,418 | A * | 8/1972 | Langecker | 425/122 |
| 3,734,449 | A * | 5/1973 | Itou et al. | 249/114.1 |
| 3,749,543 | A * | 7/1973 | Stansbury | 425/393 |
| 3,770,860 | A * | 11/1973 | Amberg et al. | 264/509 |
| 3,822,580 | A * | 7/1974 | Jamet et al. | 374/43 |
| 3,825,055 | A * | 7/1974 | Mino et al. | 164/132 |

(Continued)

FOREIGN PATENT DOCUMENTS

DE   10 2005 030 678   1/2007
FR   2189192 A *   3/1974 ............. B29D 27/00

(Continued)

*Primary Examiner* — Seyed Masoud Malekzadeh
(74) *Attorney, Agent, or Firm* — Clark & Brody

(57) ABSTRACT

The invention relates to a mold for thermoforming food pots having a decoration, and to an associated method, the mold (1) being in the form of a plate in the thickness of which at least one cell (2) for thermoforming a pot is formed, characterized in that it comprises an element (3) with an effusivity less than that of the mold, which is arranged on at least a part of the peripheral wall (21) of the cell, the said part being intended to be in contact with an overlap zone of the decoration.

11 Claims, 2 Drawing Sheets

Section B-B

(56) References Cited

U.S. PATENT DOCUMENTS

| | | | | |
|---|---|---|---|---|
| 3,912,438 A | * | 10/1975 | Padovani | 425/292 |
| 3,920,371 A | * | 11/1975 | Faller | 425/388 |
| 3,975,134 A | * | 8/1976 | Repenning | 425/504 |
| 4,010,230 A | * | 3/1977 | Repenning | 264/458 |
| 4,048,781 A | * | 9/1977 | Johansen | 53/453 |
| 4,134,717 A | * | 1/1979 | Philippon et al. | 425/383 |
| 4,149,841 A | * | 4/1979 | Patterson | 425/398 |
| 4,225,053 A | * | 9/1980 | Naugle et al. | 229/5.84 |
| 4,230,298 A | * | 10/1980 | Valyi | 249/65 |
| 4,270,964 A | * | 6/1981 | Flaskett | 156/228 |
| 4,308,086 A | * | 12/1981 | Valyi | 156/423 |
| 4,382,767 A | * | 5/1983 | Naugle et al. | 425/504 |
| 4,409,053 A | * | 10/1983 | Naugle et al. | 156/287 |
| 4,426,002 A | * | 1/1984 | Rez | 206/523 |
| 4,717,521 A | * | 1/1988 | Border et al. | 264/219 |
| 4,717,525 A | * | 1/1988 | Iizuka et al. | 264/521 |
| 4,755,129 A | * | 7/1988 | Baker et al. | 425/292 |
| 4,854,850 A | * | 8/1989 | Hautemont | 425/503 |
| 4,899,976 A | * | 2/1990 | Cederroth et al. | 249/61 |
| 4,979,890 A | * | 12/1990 | Bracesco | 425/399 |
| 5,017,125 A | * | 5/1991 | Finnah | 425/504 |
| 5,087,462 A | * | 2/1992 | Bekele et al. | 426/129 |
| 5,091,034 A | * | 2/1992 | Hubert | 156/711 |
| 5,232,653 A | * | 8/1993 | Addeo et al. | 264/515 |
| 5,330,777 A | * | 7/1994 | Mize et al. | 426/383 |
| 5,362,436 A | * | 11/1994 | Wagner | 264/321 |
| 5,453,237 A | * | 9/1995 | Padovani | 264/153 |
| 5,591,463 A | * | 1/1997 | Padovani | 425/359 |
| 5,597,593 A | * | 1/1997 | Lebensfeld et al. | 425/441 |
| 5,683,648 A | * | 11/1997 | Fortin | 264/550 |
| 5,728,474 A | * | 3/1998 | Niemeyer et al. | 428/458 |
| 5,776,399 A | * | 7/1998 | Swenson | 264/219 |
| 5,968,438 A | * | 10/1999 | Imaizumi | 264/296 |
| 5,985,191 A | * | 11/1999 | Clarke | 264/55 |
| 6,159,568 A | * | 12/2000 | Freedman et al. | 428/36.91 |
| 6,165,407 A | * | 12/2000 | Tahara et al. | 264/328.1 |
| 6,196,828 B1 | * | 3/2001 | Newby, Sr. | 425/522 |
| 6,315,150 B1 | * | 11/2001 | Takai et al. | 220/628 |
| 6,413,460 B1 | * | 7/2002 | Wisniewski et al. | 264/254 |
| 6,440,354 B1 | * | 8/2002 | Takai et al. | 264/550 |
| 7,083,805 B2 | * | 8/2006 | Begleiter | 424/464 |
| 7,293,981 B2 | * | 11/2007 | Niewels | 425/555 |
| 7,335,006 B2 | * | 2/2008 | Wilson et al. | 425/112 |
| 7,785,098 B1 | * | 8/2010 | Appleby et al. | 425/470 |
| 7,976,766 B2 | * | 7/2011 | Jacson et al. | 264/534 |
| 2001/0040161 A1 | * | 11/2001 | Peters | 220/4.23 |
| 2002/0018876 A1 | * | 2/2002 | Matsuki et al. | 428/174 |
| 2003/0094722 A1 | * | 5/2003 | Matsuki et al. | 264/45.4 |
| 2004/0047939 A1 | * | 3/2004 | Frank et al. | 425/501 |
| 2004/0096608 A1 | * | 5/2004 | King et al. | 428/35.7 |
| 2004/0165645 A1 | * | 8/2004 | Mathis | 374/43 |
| 2004/0241049 A1 | * | 12/2004 | Carvalho | 422/100 |
| 2005/0019439 A1 | * | 1/2005 | Matsuki et al. | 425/4 R |
| 2005/0127565 A1 | * | 6/2005 | Wilson et al. | 264/275 |
| 2006/0123677 A1 | * | 6/2006 | Jazbinsek | 40/310 |
| 2006/0222237 A1 | * | 10/2006 | Du et al. | 382/152 |
| 2008/0099964 A1 | * | 5/2008 | Guarriello et al. | 264/544 |
| 2008/0118599 A1 | * | 5/2008 | Tonga et al. | 425/535 |
| 2008/0292741 A1 | * | 11/2008 | Wrosz et al. | 425/357 |
| 2009/0130275 A1 | * | 5/2009 | Trost et al. | 426/396 |
| 2009/0152759 A1 | * | 6/2009 | Malone et al. | 264/177.16 |
| 2009/0194916 A1 | * | 8/2009 | Nakazato et al. | 264/554 |
| 2010/0203186 A1 | * | 8/2010 | Tsau et al. | 425/526 |
| 2011/0001263 A1 | * | 1/2011 | Bonnier | 264/265 |
| 2011/0214803 A1 | * | 9/2011 | Homburg et al. | 156/219 |
| 2012/0055832 A1 | * | 3/2012 | Riethmueller | 206/499 |

FOREIGN PATENT DOCUMENTS

| | | | | |
|---|---|---|---|---|
| FR | 2 340 185 | | 9/1977 | |
| FR | 2 528 355 | | 12/1983 | |
| GB | 2 238 974 | | 6/1991 | |
| JP | 05278039 A | * | 10/1993 | B29C 33/38 |

* cited by examiner

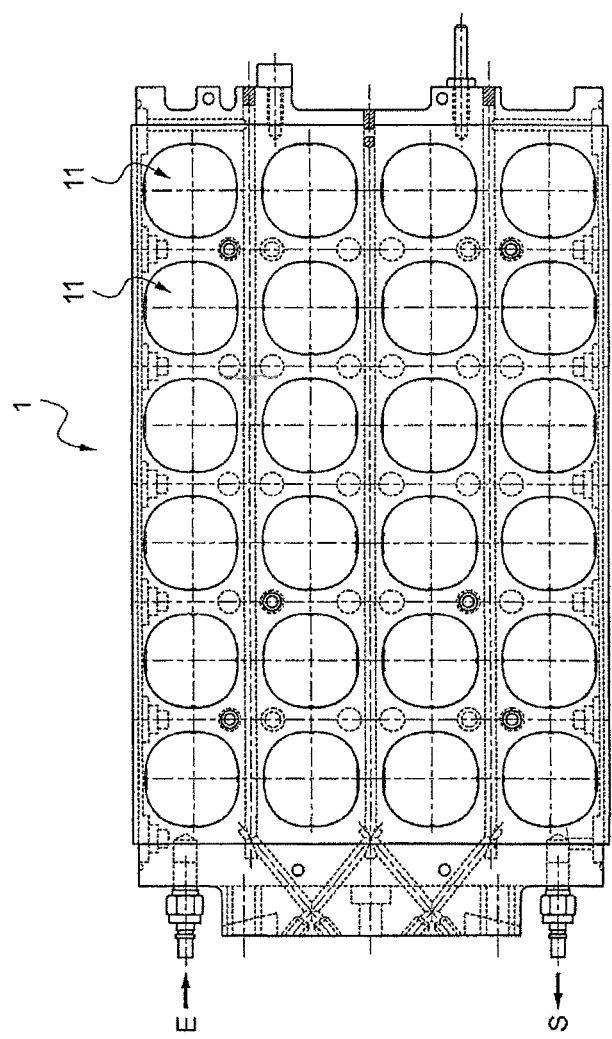

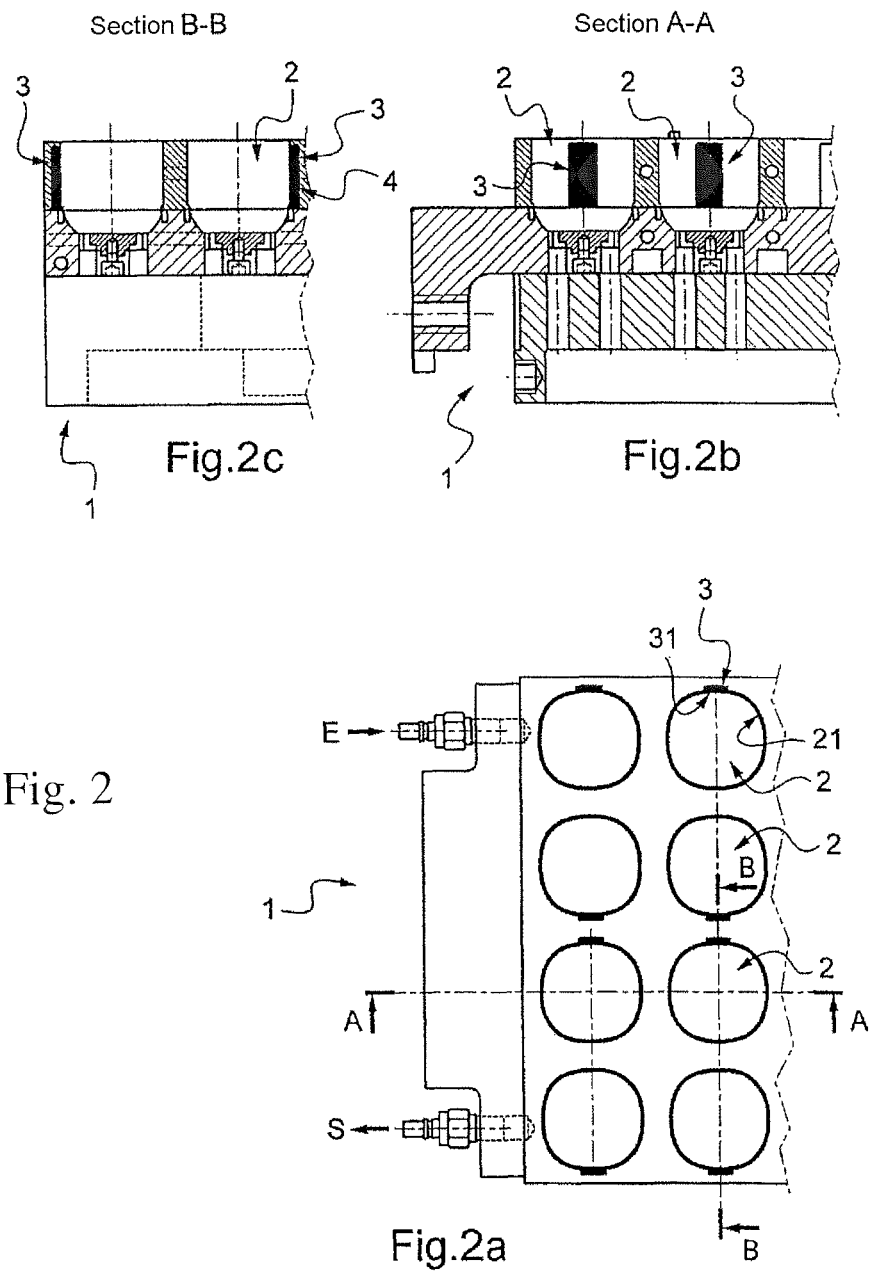

THERMOFORMING MOULD WITH THERMAL INSULATION AND ASSOCIATED METHOD

The invention relates to the field of thermoforming moulds.

The invention relates more precisely to the thermoforming moulds used in the food industry to manufacture plastic pots and deposit a decoration around the pot.

These moulds are generally in the form of a plate in which cells for thermoforming the pots are formed. The pots are for example yoghurt pots and the decoration thermobonded onto the pot is most often made of thermo-adhesive paper.

In order to manufacture a plastic pot by thermoforming, decoration is arranged in the mould against a peripheral wall of it, then plastic in the form of a preheated plate is introduced into the mould and is subsequently pressed against the walls of the mould by blowing.

The temperature of the plastic intended to form the pot is higher than that of the mould. Thus, the plastic cools and solidifies upon contact with the mould: this is the thermoforming operation.

During thermoforming, the heat transferred to the mould from the plastic introduced into the mould is exploited to thermobond the decoration onto the plastic pot.

The mould must thus be cold enough that the plastic material pressed by blowing into the mould solidifies in order to form a food pot. The mould must also remain hot enough to ensure thermobonding of the decoration onto the pot.

Thus, in order to maintain a temperature of the mould making it possible both to thermoform the food pots and to thermobond a decoration onto the pot, current moulds provide fluid circulation channels for regulating the temperature.

Specifically, if the mould is too hot, the formation of the plastic pot will not be satisfactory. Furthermore, if the mould is too cold, the thermobonding of the decoration may prove insufficient, particularly in an overlap zone of the decoration on itself.

This is because the decoration has a length greater than the circumference of a cell of the mould, so that once placed in the mould the decoration has an overlap zone on itself.

The temperature regulation for maintaining conditions which allow thermoforming is not very difficult to obtain. The aim here is to remove the heat introduced into the mould by the plastic material. Otherwise, the heat would accumulate in the mould during the thermoforming operations, at the risk of no longer ensuring good pot thermoforming conditions.

To this end, existing moulds provide channels intended to convey a cooling fluid.

The temperature regulation obtained with these channels must also allow efficient thermobonding of a decoration on the food pot.

This design allows thermobonding of the decoration which is satisfactory over essentially all the perimeter of the pot.

However, the same is not true in the overlap zone of the decoration. This is because in the overlap zone the thickness of the decoration is doubled and bonding imperfections are regularly observed between the two thicknesses of the decoration and/or of the decoration on the food pot.

It is thus an object of the invention to provide a mould making it possible to reduce the imperfections of the bonding in the overlap zone, between the two thicknesses of the decoration and/or between the decoration and the food pot.

To this end, the invention provides a mould for thermoforming food pots having a decoration, this mould being in the form of a plate in the thickness of which at least one cell for thermoforming a pot is formed, characterized in that it comprises an element with an effusivity less than that of the mould, which is arranged on at least a part of the peripheral wall of the cell and extends along the height of this wall, the said part being intended to be in contact with an overlap zone of the decoration.

This mould also has at least one other following characteristic, taken individually or in combination:
  it comprises a compartment for inserting the said element;
  the compartment opens onto the upper surface of the mould;
  the compartment extends over the entire height of the peripheral wall of the cell;
  the element is a sheet arranged against the peripheral wall of the mould;
  the element is selected to be made of one of the following materials: a ceramic, a thermally stable plastic material, a felt, a fluoropolymer resin, an epoxy resin containing microbeads, a syntactic resin, a polyaryl ether ketone resin (PEEK) or polyoxymethylene;
  the element is removable;
  it comprises a plurality of cells, each cell having at least one element of selected effusivity;
  it comprises means for cooling the mould, so as to keep it at a temperature lower than or equal to a threshold temperature $T_{threshold}$ for thermoforming the pot.

In order to achieve this object, a method of thermoforming food pots having a decoration is also provided, which comprises the steps consisting in:
  introducing a preheated plastic material into the cell;
  pressing the plastic material against the wall of the cell by blowing,
characterized in that before these steps it comprises a step consisting in depositing a preformed decoration in a cell of a mould according to the invention, so that an overlap zone of the decoration lies in contact with the element.

The invention will be better understood, and other objects, advantages and characteristics of it will become more readily apparent, on reading the following description which is given with reference to the appended drawings, in which:

FIG. 1 represents a conventional metal mould having a plurality of food pot moulding cells;

FIG. 2 represents a mould according to the invention, in three separate views illustrated respectively by FIGS. 2(a), 2(b) and 2(c).

FIG. 1 represents a known mould 1.

This mould 1 is produced using a metallic material, for example aluminium. The mould 1 comprises a plurality of cells 11, each intended to form a food pot.

It also comprises a cooling means, represented by its inlet E and its outlet S. This cooling means has channels which are arranged in the thickness of the mould 1 and transport a cooling fluid in order to maintain a constant temperature in the cells.

This temperature is selected to be low enough so that cooling of the hot plastic introduced into the mould makes it possible to form the food pot, but also high enough so that the decoration can bond to the food pot.

FIG. 2 in turn represents a mould 1 according to the invention, in three different views, namely a plan view in FIG. 2(a), a view in section A-A in FIG. 2(b) taken in the width direction of the mould represented in FIG. 2(a), and a view in partial section B-B in FIG. 2(c) taken in the length direction of the mould represented in FIG. 2(a).

This mould 1 comprises a plurality of cells 2, each intended to form a food pot. In the present case, two rows of four cells each are provided. Other arrangements could of course be provided, or a mould having only one cell could even be envisaged. In particular, it could correspond in its overall appearance to the mould illustrated in FIG. 1.

The mould 1 is in the form of a plate, in the thickness of which cells 2 for thermoforming pots are formed.

In at least one of the cells 2 of the mould, an element 3 is also provided whose effusivity is both less than the effusivity of the mould 1 and more than the effusivity of the material intended to form the pots.

One 31 of the faces of the element 3 coincides with the peripheral wall 21 of the cell 2.

The effusivity E of a material is defined by the relation:

$$E = \sqrt{\rho c \lambda} \quad (R1)$$

where:
$\rho$ is the density of the material (kg·m$^{-3}$)
c is the specific heat capacity of the material (J·kg$^{-1}$·K$^{-1}$)
$\lambda$ is the Thermal Conductivity of the Material (W·m$^{-1}$·K$^{-1}$)

When the mould 1 of effusivity $E_1$ at the temperature $T_1$ is suddenly brought in contact with the material intended to form the pot in the cell 2, the said material being at a temperature $T_2$ ($T_2 > T_1$) and having an effusivity $E_2$, then the equilibrium temperature $T_{eq}$ at the interface between the mould 1 and the plastic material may be defined approximately by the relation:

$$T_{eq} = \frac{E_1 T_1 + E_2 T_2}{E_1 + E_2} \quad (R2)$$

relation (R2) in fact being exact for plane contact surfaces having no contact resistance.

The working principle leading to relation (R2) may, however, be applied to the case in point.

This equilibrium temperature $T_{eq}$ must be lower than a threshold temperature $T_{threshold}$ for carrying out the operation of thermoforming the pot.

The mould 1 is metallic in nature, and therefore has a high effusivity. For example, the effusivity of steel is about 14,000 (SI units). Conversely, the effusivity $E_2$ of the material intended to form the pots, the said material being for example of plastic, is very low relative to that of a metal, generally about 30 times less.

The temperature of the mould is for example of the order of 30° C., and is lower than the temperature $T_{threshold}$ for thermoforming the food pot. Furthermore, the temperature $T_2$ of the preheated plastic lies between 120° C. and 150° C., preferably about 135° C.

Consequently, when the material intended to form the food pot is brought in contact with the mould 1, the equilibrium temperature $T_{eq}$ is very close to the temperature $T_1$ of the mould.

The mould 1 comprises a cooling means, represented by its inlet E and its outlet S, having channels arranged in the mass of the mould in order to facilitate removal of the heat introduced by the plastic material during the successive thermoforming operations, and to do so according to the ducts existing in current moulds.

As a variant, it is possible to envisage the mould 1 not having a duct for cooling the mould. In this case, in order to prevent the temperature of the mould from rising excessively during the successive thermoforming operations, the mould 1 may be dimensioned so as to have a large contact area with the ambient medium. It is also possible to employ means for creating a forced air flow on the surface of the mould during its use.

The design of the mould according to the invention is relatively simple, in so far as it does not provide a specific network of channels for maintaining a sufficient temperature in order to thermobond the decoration onto the food pot, particularly in the overlap zone of the decoration where the thickness of the decoration is doubled.

In fact, in the scope of the invention this function is carried out by the element 3 whose effusivity $E'_1$ is less than the effusivity $E_1$ of the mould 1, that is to say $E'_1 < E_1$ (R3). Provision may also be made for the material forming the element 3 likewise to have an effusivity $E'_1$ which is more than the effusivity of the plastic material $E_2$.

When the machine is started in order to carry out thermoforming/thermobonding operations, the temperature $T_1$ of the metal part of the mould 1 and that $T'_1$ of the element 3 are the same, that is to say $T_1 = T'_1$.

Because of relation R3, application of relation R2 leads to the relation $T'_{eq} > T_{eq}$; where $T'_{eq}$ is the equilibrium temperature at the interface between the plastic material and the element 3.

It will therefore be understood that the plastic material introduced and pressed by blowing into a cell of the mould will experience different temperatures when it is brought in contact with the mould.

More precisely, as a function of the material selected for forming the element 3, it will be possible for the equilibrium temperature $T'_{eq}$ at the interface between the plastic material intended to form the pot and the element 3 to be kept during the thermoforming at a value higher than a threshold temperature $T'_{threshold}$, beyond which the thermobonding of a decoration onto the pot will have good quality.

Provision may also be made for the effusivity $E'_1$ of the element 3 to be more than the effusivity $E_2$ of the plastic material formed in the mould.

It will therefore be understood that the plastic material formed in a cell of the mould is in contact with two types of materials, on the one hand the metal part of the mould 1, which may be termed the "conductive" part of the mould, and on the other hand the element 3 which may be termed the "insulating" part of the mould.

The element 3 has a minimum width for covering the overlap zone of a decoration, the problems of bonding the decoration being encountered in the prior art at the decoration double thickness.

The element 3 may, however, extend beyond this minimum width in order to cover a larger part of the peripheral wall of a cell of the mould. In such case, however, it will be necessary to take care that the material forming the element 3 allows efficient thermoforming of the pot to be maintained.

The element 3 must also be compatible with the requirements and standards associated with the manufacture of a food product container.

Materials satisfying the aforementioned criteria are for example made of ceramic, thermally stable plastic material, felt, fluoropolymer resin, epoxy resin filled with microbeads, in which case these microbeads may for example be made of glass or polytetrafluoroethylene (Teflon®), syntactic resin, polyaryl ether ketone resin (PEEK) or polyoxymethylene (POM).

The cooling of the mould entailed by circulating the fluid in the mass of the mould may be such that it allows the temperature of the metal part of the mould 1 and the element 3 to be kept at a substantially similar and substantially constant value in the course of the successive operations of thermoforming/thermobonding the food pots.

Provision may furthermore be made, albeit optionally, for the material forming the element 3 to have a high volumetric heat capacity ρc and a low thermal conductivity λ, so that the temperature T'$_1$ of the element 3 increases in the course of the thermoforming operations despite the cooling entailed by the fluid circulation in the mass of the mould.

In such a case it will be understood that the temperature T'$_1$ of the element 3 diverges from the temperature T$_1$ of the metal part of the mould. This is because such a material has a high capacity to conserve heat.

Consequently, this promotes the increase in the equilibrium temperature T'$_{eq}$ in each thermoforming operation, giving a wider safety margin relative to the value T'$_{threshold}$.

The element 3 may be provided in a plurality of forms in order to fulfil its function.

The present description provides some exemplary embodiments below, which are given by way of nonlimiting examples.

A preferred embodiment of the invention has for example been represented in FIG. 2, in which an insert 3 housed in the wall of the mould is provided.

To this end, the mould 1 has a compartment 4 for inserting the said element 3. This compartment 4 opens onto the peripheral wall 21 of the cell 2. The insert thus has a face opening onto the peripheral wall 21 of the cell 2, this face 31 hence being capable of coinciding with the peripheral wall 21 of the cell 2.

The compartment 4 may be provided in a plurality of forms as a function of the desired application.

For example, if the decoration intended to be thermobonded onto a pot has a height identical to the height of the pot, the compartment 4 may extend over the entire height of the peripheral wall 21 of the cell 2. In this case, the compartment 4 also opens onto the upper face of the mould. Such a compartment 4 is represented in FIG. 2.

As a variant, if the decoration intended to be thermobonded onto a pot has a height strictly less than the height of the pot, the compartment 4 may extend over a height strictly less than the height of the peripheral wall 21 of the cell 2.

It will be understood that the element 3 may have a variable height as a function of the height of the decoration.

The element 3 may cover an overlap zone of the decoration only over a part of the height of this overlap zone. Advantageously, the height of the element 3 has a minimum value for covering the overlap zone of the decoration of the entire height of this decoration.

The element 3 may have a height strictly less than or equal to the height of the compartment. Advantageously, the height of the element 3 coincides with that of the compartment 4, as represented in FIG. 2.

In another embodiment, an element 3 may be envisaged in the form of a sheet arranged against the peripheral wall 21 of the mould.

The sheet 3 will also have a minimum width for covering the overlap zone of a decoration. However, the sheet 3 may extend beyond this minimum width in order to cover a larger part of the peripheral wall of a cell of the mould. In such a case, however, it is necessary to take care that the material forming the sheet 3 allows efficient thermoforming of the pot to be maintained.

Furthermore, the sheet 3 may have a variable height as a function of the height of the decoration. The sheet 3 may thus cover an overlap zone of the decoration only over a part of the height of this overlap zone. In an advantageous case, the height of the sheet 3 has a minimum value for covering the overlap zone of the decoration over the entire height of this decoration.

According to this embodiment, it is not necessary to have a compartment in the wall of the mould.

The sheet 3 has a small thickness in relation to the dimensions of the cell, so that it can merge with the peripheral wall 21 of the cell 2 and it does not affect the dimensions of the pot which can be thermoformed by the cell 2.

Irrespective of the type of element 3 envisaged, it may be removable. This has the advantage that the element 3 can be changed while keeping the same mould 1.

In view of the shape of the overlap zone of the decoration, it will be understood that the element 3 extends along the height of the peripheral wall 21 of the cell 2, irrespective of the embodiment envisaged. For example, reference may be made to FIG. 2 for the first embodiment. In fact, the overlap zone of the decoration is generally higher than it is wide.

The invention therefore benefits from the "insulating" qualities of certain materials in relation to the "conductive" qualities of the metal forming the mould 1, in order to carry out both thermoforming and high-quality thermobonding of the decoration, particularly in the overlap zone of the decoration.

The mould is thereby greatly simplified in its structure, its manufacture and its use.

The mould according to the invention then makes it possible to carry out a method of thermoforming food pots having a decoration, the method comprising the steps consisting in:

arranging a preformed decoration in a cell 2 of a mould 1 as defined above, so that an overlap zone of the decoration lies in contact with the element 3;

introducing a preheated plastic material into the cell;

pressing the plastic material against the wall of the cell by blowing.

The preforming of the decoration is carried out in a device (not shown) which makes it possible to roll up the decoration in order to give it a substantially cylindrical shape, with a diameter slightly less than that of a cell of the mould so that it can be inserted therein. As mentioned above, the decoration has a length greater than the circumference of the cell, which explains why there is an overlap zone of the decoration on itself.

The invention claimed is:

1. Mould (1) for thermoforming food pots, made of plastic material, and having a thermobonded decoration, the mould being in a form of a plate in a thickness wherein at least one cell (2) for thermoforming a respective pot is formed, the decoration having a length greater than a circumference of the at least one cell of the mould, so that once placed in the mould the decoration has an overlap zone, where a respective thickness of the respective decoration is doubled, which has a height and a width, said height being greater than said width, characterized in that the at least one cell (2) comprises an element (3) with an effusivity less than that of the mould and more than an effusivity of the plastic material intended to form the food pots, wherein the element is arranged on at least a part of a peripheral wall (21) of the cell and extends along a height of the peripheral wall (21), the element being intended to be in contact with at least a part of said overlap zone of the decoration, wherein the element includes a respective height and a respective width and the respective height is greater than the respective width, and the element is configured to reduce formation of imperfections of bonding in the overlap zone.

2. Mould for thermoforming food pots according to claim 1, in which a compartment (4) is provided for inserting the element.

3. Mould for thermoforming food pots according to claim 2, in which the compartment (4) opens onto an upper surface of the mould.

4. Mould for thermoforming food pots according to claim 2, in which the compartment (4) extends over an entire height of the peripheral wall (21) of the at least one cell.

5. Mould for thermoforming food pots according to claim 1, in which the element (3) is a sheet arranged against the peripheral wall (21) of the mould.

6. Mould for thermoforming food pots according to claim 1, in which the element (3) is selected to be made of one of the following materials: a ceramic, a thermally stable plastic material, a felt, a fluoropolymer resin, an epoxy resin containing microbeads, a syntactic resin, a polyaryl ether ketone resin or polyoxymethylene.

7. Mould for thermoforming food pots according to claim 1, in which the element (3) is removable.

8. Mould for thermoforming food pots according to claim 1, in which a plurality of cells (2) are provided, each cell having at least one element (3) of selected effusivity.

9. Mould for thermoforming food pots according to claim 1, in which cooling means, with an inlet and an outlet, are provided for cooling the mould, so as to keep said mould at a temperature lower than or equal to a threshold temperature ($T_{threshold}$) for thermoforming the pot.

10. Mould (1) for thermoforming food pots according to claim 1, in which the element has a minimum width for covering the overlap zone of a decoration.

11. Mould (1) for thermoforming food pots according to claim 1, in which the element has a variable height for covering at least a part of the height of the overlap zone.

* * * * *